(12) United States Patent
Kashyap (10) Patent No.: US 7,277,913 B2
(45) Date of Patent: Oct. 2, 2007

(54) PERSISTENT QUEUING FOR DISTRIBUTED FILE SYSTEMS

(75) Inventor: Ravi Kashyap, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 185 days.

(21) Appl. No.: 10/143,191

(22) Filed: May 9, 2002

(65) Prior Publication Data

US 2003/0212813 A1 Nov. 13, 2003

(51) Int. Cl.
*G06F 15/16* (2006.01)
(52) U.S. Cl. .................. 709/203; 709/217; 709/224; 707/10; 707/104.1
(58) Field of Classification Search .............. 709/203, 709/217, 224–226; 707/10, 104.1
See application file for complete search history.

(56) References Cited

U.S. PATENT DOCUMENTS

| | | | |
|---|---|---|---|
| 5,916,307 A * | 6/1999 | Piskiel et al. .............. 719/314 |
| 6,278,976 B1 | 8/2001 | Kochian | |
| 6,295,541 B1 | 9/2001 | Bodnar et al. | |
| 6,401,104 B1 | 6/2002 | LaRue et al. | |
| 6,401,136 B1 * | 6/2002 | Britton et al. .............. 719/314 |
| 6,477,545 B1 | 11/2002 | LaRue | |
| 6,529,932 B1 * | 3/2003 | Dadiomov et al. ......... 718/101 |
| 6,546,428 B2 * | 4/2003 | Baber et al. ................ 709/232 |
| 6,640,325 B1 * | 10/2003 | Fischer ...................... 714/748 |
| 6,654,355 B1 | 11/2003 | Marbach et al. | |
| 6,665,644 B1 | 12/2003 | Kanevsky et al. | |
| 6,718,361 B1 | 4/2004 | Basani et al. | |
| 2002/0147835 A1 * | 10/2002 | Zatloukal et al. .......... 709/237 |
| 2003/0145020 A1 | 7/2003 | Ngo et al. | |
| 2005/0055382 A1 | 3/2005 | Ferrat et al. | |

* cited by examiner

*Primary Examiner*—Ario Etienne
*Assistant Examiner*—LaShonda Jacobs
(74) *Attorney, Agent, or Firm*—Dorsey & Whitney LLP (57) ABSTRACT

Disclosed are novel methods and apparatus for persistent queuing in distributed file systems. In an embodiment, an apparatus is disclosed. The apparatus includes a distributed file system including a plurality of remote systems. The plurality of remote systems includes a sender site and a receiver site. The apparatus further includes a local queue accessible by the sender site; a remote queue accessible by the receiver site; a next attempt time indicator; and an attempt counter. The next attempt time indicator may specify a next time to install a transferred file on the receiver site. The attempt counter indicates how many attempts have been made to install the transferred file on the receiver site.

27 Claims, 5 Drawing Sheets

| InsertTime |
| --- |
| 402 |
| SendTime |
| 404 |
| ReceivedTime |
| 406 |
| CompleteTime |
| 408 |
| Installation Message |
| 410 |
| Checksum |
| 412 |
| Resend |
| 414 |
| Job Descriptions |
| 416 |
| Pointers |
| 418 |
| Destination Site Id |
| 420 |
| Local Site Id |
| 422 |
| Unsent Job Count |
| 424 |

PERSISTENT QUEUING FOR DISTRIBUTED FILE SYSTEMS

CROSS-REFERENCE TO RELATED APPLICATIONS

This application relates to application Ser. No. 10/143,313, entitled "Distributed Configuration-Managed File Synchronization Systems," and application Ser. No. 10/142,413, entitled "Delta Transfers in Distributed File Systems," both filed concurrently herewith and in the name of the present assignee. All these documents are hereby incorporated by reference for all purposes.

FIELD OF INVENTION

The subject of this application relates generally to the field of data transfer. More particularly, an embodiment of the present invention relates to provision of persistent queuing in distributed file systems.

BACKGROUND OF INVENTION

As the use of digital data becomes more prominent in everyday life, the need for access to reliable data sources increases. For example, a user may need regular access to data that can be physically located across different buildings or even around the world. This is often the case with respect to large company projects that may involve many groups worldwide working on a same solution.

As these types of joint projects become more commonplace, so does the need for having access to such data in real-time. In other words, the data accessed by each remote site will need to be current whether that data is stored locally or halfway around the world. Accordingly, the users need to have access to the latest version of the data as soon as it is released into the system from any site.

In many current implementations utilizing transmission control protocol/Internet protocol (TCP/IP), file transfer protocol (FTP), and other similar facilities (e.g., RSYNC command provided in Unix systems) are utilized to maintain data amongst remote sites. These tools, however, are generally useful only for transferring files from one point to the next. Moreover, automation of these tools only results in synchronization among multiple sites when a batch update or a nightly synchronization is performed. Also, if one of the remote sites goes down or cannot accept external data, the data may be dropped and unavailable.

SUMMARY OF INVENTION

The present invention, which may be implemented utilizing a general-purpose digital computer, includes novel methods and apparatus to provide persistent queuing for distributed file systems that can provide ready access to data among remote users. In an embodiment, an apparatus is disclosed. The apparatus includes a distributed file system including a plurality of remote systems. The plurality of remote systems includes a sender site and a receiver site. The apparatus further includes a local queue accessible by the sender site; a remote queue accessible by the receiver site; a next attempt time indicator; and an attempt counter. The next attempt time indicator may specify a next time to install a transferred file on the receiver site. The attempt counter indicates how many attempts have been made to install the transferred file on the receiver site.

BRIEF DESCRIPTION OF DRAWINGS

The present invention may be better understood and its numerous objects, features, and advantages made apparent to those skilled in the art by reference to the accompanying drawings. These drawings, however, should not be taken to limit the invention to the specific embodiments, but are for explanation and understanding only.

The use of the same reference symbols in different drawings indicates similar or identical items.

DETAILED DESCRIPTION

In the following description, numerous details are set forth. It will be apparent, however, to one skilled in the art, that the present invention may be practiced without these specific details. In other instances, well-known structures and devices are shown in block diagram form, rather than in detail, in order to avoid obscuring the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
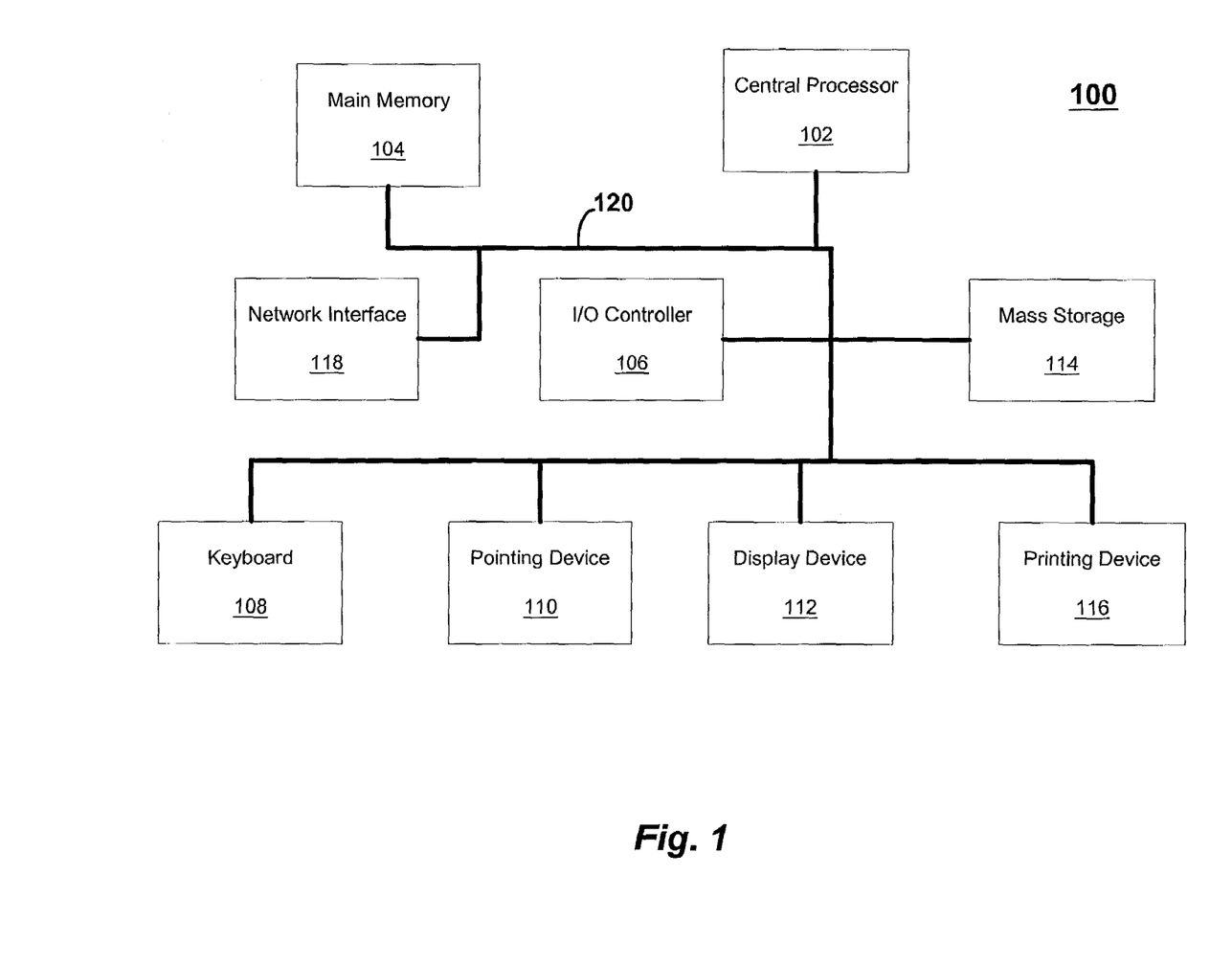
FIG. 1 illustrates an exemplary computer system 100 in which the present invention may be embodied.

FIG. 1 illustrates an exemplary computer system 100 in which the present invention may be embodied in certain embodiments. The system 100 comprises a central processor 102, a main memory 104, an input/output (I/O) controller 106, a keyboard 108, a pointing device 110 (e.g., mouse, track ball, pen device, or the like), a display device 112, a mass storage 114 (e.g., hard disk, optical drive, or the like), and a network interface 118. Additional input/output devices, such as a printing device 116, may be included in the system 100 as desired. As illustrated, the various components of the system 100 communicate through a system bus 120 or similar architecture.

In an embodiment, the computer system 100 includes a Sun Microsystems computer utilizing a SPARC microprocessor available from several vendors (including Sun Microsystems of Palo Alto, Calif.). Those with ordinary skill in the art understand, however, that any type of computer system may be utilized to embody the present invention, including those made by Hewlett Packard of Palo Alto, Calif., and IBM-compatible personal computers utilizing Intel microprocessor, which are available from several vendors (including IBM of Armonk, N.Y.). Also, instead of a single processor, two or more processors (whether on a single chip or on separate chips) can be utilized to provide speedup in operations. It is further envisioned that the processor 102 may be a complex instruction set computer (CISC) microprocessor, a reduced instruction set computing (RISC) microprocessor, a very long instruction word (VLIW) microprocessor, a processor implementing a combination of instruction sets, and the like.

The network interface 118 provides communication capability with other computer systems on a same local network, on a different network connected via modems and the like to the present network, or to other computers across the Internet. In various embodiments, the network interface 118 can be implemented in Ethernet, Fast Ethernet, wide-area network (WAN), leased line (such as T1, T3, optical carrier 3 (OC3), and the like), digital subscriber line (DSL and its varieties such as high bit-rate DSL (HDSL), integrated services digital network DSL (IDSL), and the like), time division multiplexing (TDM), asynchronous transfer mode (ATM), satellite, cable modem, and FireWire.

Moreover, the computer system 100 may utilize operating systems such as Solaris, Windows (and its varieties such as NT, 2000, XP, ME, and the like), HP-UX, IBM-AIX, Unix, Berkeley software distribution (BSD) Unix, Linux, Apple Unix (AUX), and the like. Also, it is envisioned that in certain embodiments, the computer system 100 is a general purpose computer capable of running any number of applications such as those available from companies including Oracle, Siebel, Unisys, Microsoft, and the like.

It is envisioned that the present invention may be applied to systems, which utilize a revision control system (RCS) and meta data information, individually or in combination. The RCS can be configured as a backend storage system including the actual files. It is envisioned that RCS may be hidden from users. The meta data information can include data about the actual files. The meta data may be stored in a database, such as that provided by Sybase, Inc., of Emeryville, Calif. The meta data may include relational information, block and sector information, file type, and the like.

Figure 2:
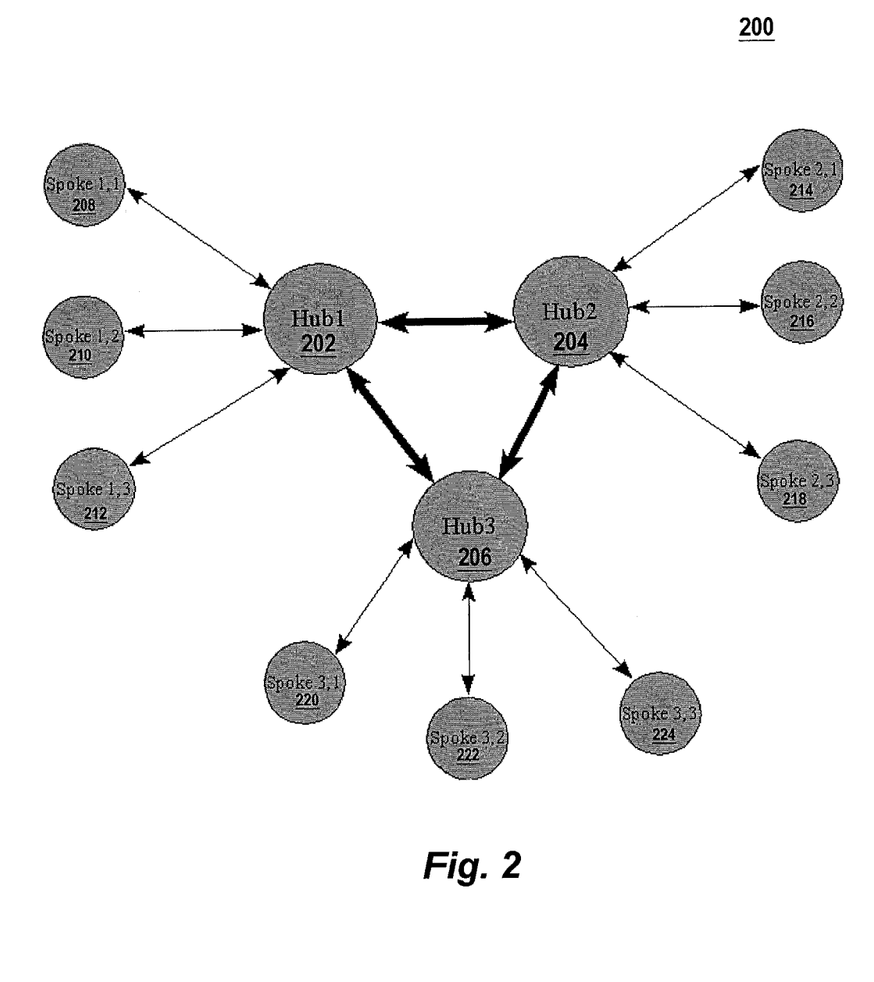
FIG. 2 illustrates an exemplary network configuration 200 in accordance with an embodiment of a present invention.

FIG. 2 illustrates an exemplary network configuration 200 in accordance with an embodiment of a present invention. As illustrated, the network configuration 200 includes three hubs (Hub1 202, Hub2 204, and Hub3 206) as an example. The hubs may be configured to communicate with each other through any number of networking tools including a point-to-point connection. Each of these hubs may have their own spokes. For example, Hub1 202 may have spokes 208, 210, and 212. Similarly, Hub2 204 may have spokes 214–218 and Hub3 may have spokes 220–224. All spokes on a single site may be grouped together to form a local subnet (e.g., with one hub and multiple spokes). Each remote site may be connected in a star topology (e.g., with the hub at the center of the star).

Each spoke may have a set of configuration parameters defined in a local or remote database. When the spoke is brought up, the spoke may utilize the configuration parameters to configure itself or auto-configure. Accordingly, each site may be easily reconfigured by, for example, changing the entries in the database that contains the configuration data for each site. Each spoke (208-224, for example) can have the following configuration parameters defined, in addition to any already existing ones:

1. VectorIn: a vector that contains the list of Ids for sites (siteIds) that send files to the spoke;
2. VectorOut: a vector that contains the list of siteIds that receive files from the spoke; and/or
3. Pass through or Store-n-go field: this field indicates to the spoke whether that spoke is just a connector or a hub (for example, with a buffer and no central directory) or a spoke (which, for example, makes a copy of the file it is transferring into the spoke's central directory).

Depending on the above parameters, each spoke can then become a hub or a spoke. Furthermore, in an embodiment, all hubs need not be in pass-through mode, and all spokes may be in store-n-go mode. For example, on a site, if there is a single spoke, it is unnecessary to add another hub on the same site. The only spoke can then act as a hub in store-n-go mode. So, each site may be configured as per the requirements at that site. In an embodiment, some of the advantages of such an architecture are that each site only transfers the file once to the other sites, but not to each spoke. This reduces network traffic. Also, such an architecture is very scalable, and is highly flexible to accommodate different configurations at each site.

In some embodiments, it is envisioned that hubs may not have users working on them. So, no new files may be created on such hubs. In case a hub hosts users, that hub may be configured similar to a spoke. For example, that hub can transfer the given file locally to all spokes, and transfer a copy to each of the remote hubs.

It is envisioned that a hub may differentiate between the local-domain generated file and the file that it received from a foreign domain. In one embodiment, the receiving entity (or module), for example upon receiving a file, can check to see if the origin site of the file is the same domain as the hub. If so, the file does not need to be routed any further and can be just locally copied. On the other hand, if the domain of the origin site is different, the hub knows that it has to transfer a copy of the file to each of the local spokes.

It is also envisioned that this checking may be performed by, for example, employing a FileReceiver module. The FileReceiver module can receive files and may run as a thread on a general-purpose computer or an appropriate networking device. The FileReceiver upon receiving a file may: (1) ensure that the received file is accurate (for example, by performing checksum validations) and/or (2) check the file origin (and if the file is foreign, the FileReceiver can route the received file locally). In an embodiment, the step (2) above can be done by the FileReceiver present on a hub rather than on a spoke. In an embodiment, if the FileReceiver module has to route the file, the FileReceiver module can insert entries into, for example, a transfer table in a database (e.g., locally). In one embodiment, there can be one entry per each local spoke in the database. Another process, e.g., a database reader (DBReader such as that discussed with respect to FIG. 3), can then handle additional work for transferring the file.

Accordingly, the routing information can be stored in a database. In an embodiment, with the above-proposed architecture, each hub may know which domain it belongs to, and what spokes exist on its local domain. Also, each spoke may know to which other spokes and hubs is it directly connected. For example, an entry in a transfer table can be inserted for each spoke and/or hub that the given local spoke is directly connected to. In certain embodiments, the DBReader module on the local spoke can then handle or initiate the transfers.

Figure 3:
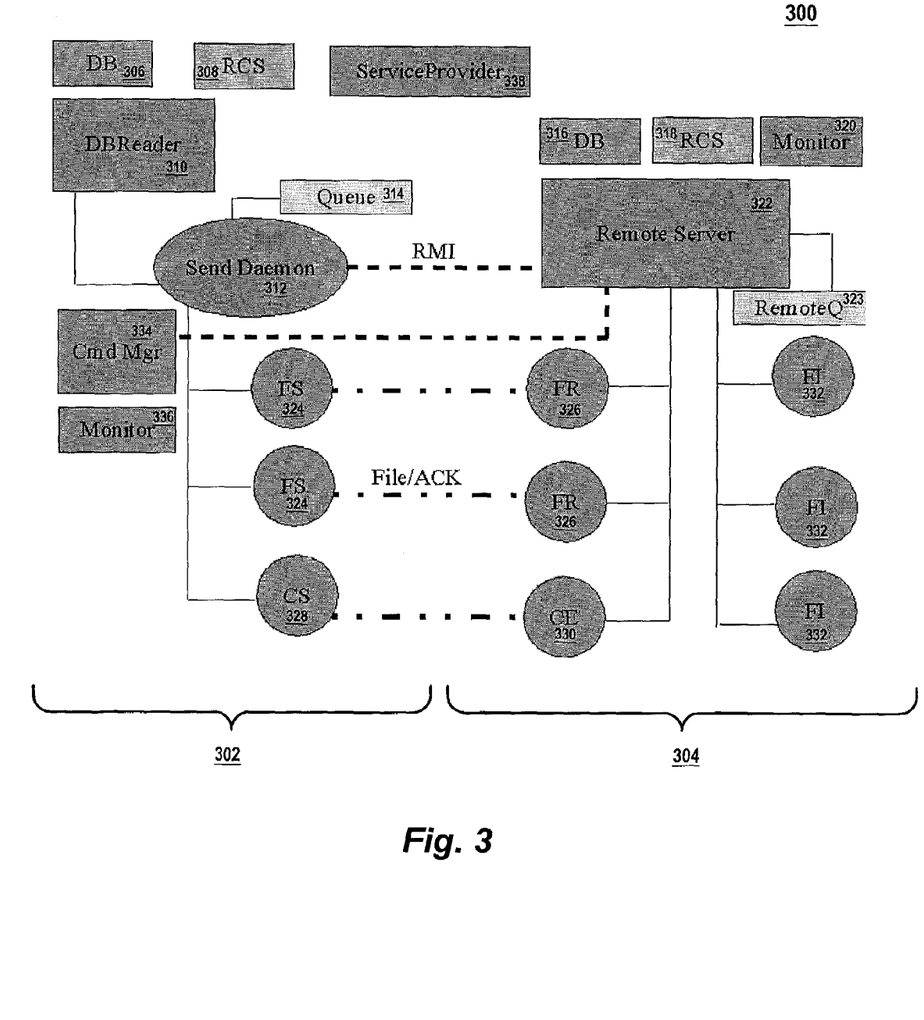
FIG. 3 illustrates an exemplary communication system 300 in accordance with an embodiment of a present invention.

FIG. 3 illustrates an exemplary communication system 300 in accordance with an embodiment of a present invention. The communication system 300 includes a sender site 302 and a receiver site 304. The sender site 302 includes a database 306 (DB), an RCS 308, a DBReader module 310, and a send daemon 312. It is envisioned that the database 306 may store meta data and other data as required. The RCS may be hidden from users and store actual files being transferred and/or maintained on the sender site 302. The DBReader module 310 can be a process that may run on a computer system (such as that discussed with respect to FIG. 1). In certain embodiments, the DBReader module 310 may be run on a multitasking system as a process, for example. The DBReader module 310 may run on a system continuously. It is envisioned that the DBReader module 310 has access to the database 306 and the RCS 308, and can process the stored data. The DBReader module 310 may initiate a file transfer process by, for example, reading a job description from a transfer table stored, for example, in the database 306.

In an embodiment, the DBReader module 310 may further communicate with the send daemon 312. It is envisioned that the send daemon 312 can be responsible for sending data from the sender site 302 to the receiver site 304. The send daemon 312 can be a Unix daemon thread or other similarly configured process running on a computer system. The send daemon 312 may be configured to run in the background so it can be activated with short notice. In one embodiment, the send daemon 312 may be a thread spawned from the DBReader module 310.

The send daemon 312 may have access to a local queue 314 (internal or external to the send daemon 312). The local queue 314 may provide storage capabilities to the send daemon 312. It is envisioned that the local queue 314 may be any type of storage such as random access memory (RAM), its varieties such as dynamic RAM (DRAM), static RAM (SRAM), synchronous DRAM (SDRAM), and the like. Further information regarding the local queue 314 may be found by reference to FIG. 4.

The receiver site 304 includes a database 316, an RCS 318, a monitor 320, and a remote server 322. The database 316 and RCS 318 may be similar to those of the sender site 302 (i.e., database 306 and RCS 308). The monitor 320 can be on lookout for information of interest and inform a selected party (e.g., a user) about the status of the information desired. For example, the monitor 320 may be a visual aid indicating status of a transfer in real-time. The remote server 322 can have access to the database 316, RCS 318, and monitor 320. The remote server 322 may also have access to a remote queue 323 (RemoteQ). The remote queue 323 may be a similar device such as that discussed with respect to the local queue 314. The remote queue 323 can provide the remote server 322 with storage capabilities. It is envisioned that the remote queue 323 may store meta data for the receiver site 304. Also, the remote queue 323 may provide memory for delivered job descriptions which are uninstalled. Further information regarding the remote queue 323 may be found by reference to FIG. 5.

The sender site 302 can also include one or more file sender/s 324 which may communicate with one or more, respective, file receiver/s 326. This communication may also utilize acknowledge capabilities to ensure a file is properly transferred. Other error correction capabilities may also be used to ensure proper communication between the file senders 324 and file receivers 326. Such error correction capabilities may include parity checking, M0-5 checksum validation, and the like. The file senders 324 may hold all information about the file that is being transferred. Further, it is envisioned that the file sender 324 may perform one or more of the following: physically transfer a file from the sender site 302 to the receiver site 304, obtain acknowledgment regarding the transfer, update a ReceivedTime field (indicating when the data sent was received), for example, in the transfer table that may be stored in the database 306. The file sender 324 can be a thread spawned by the send daemon 312.

The file receiver 326 may be responsible for one or more of the following tasks: receiving files over, for example, a TCP socket, re-calculating the checksum, verifying file correctness, copying the file into the designated buffer area, sending an ACK/NAK signal (to acknowledge receipt or non-receipt), remove the current entry (or row) from queue of the remote server 322, and update the file receiver count at the remote server 322. In some embodiments, the file receiver 326 may be a thread spawned by a remote server routine.

The sender site 302 can additionally include a command sender 328 for sending commands from the sender site 302 to a command executor (CE) 330 on the receiver site 304. It is envisioned that the command sender 328 may perform one or more of the following: start a server socket, wait for the acknowledgment from the command executor 330, and update the appropriate database (such as the database 316). Moreover, the command sender 328 may be a thread spawned by the remote server 322. Furthermore, the command executor 330 may perform one or more of the following: connect to the command sender 328, execute the command (e.g., copy data, delete data, and/or delete directory), send acknowledgment, and update information about when an action is done in an appropriate database (such as the database 316). Moreover, the command executor 330 may be a thread spawned by the remote server 322.

In an embodiment, the sender site 302 can include a command manager (Cmd Mgr) 334 and a monitor 336. The monitor 336 may be similar to that discussed with respect to the receiver site 304 (i.e., the monitor 320). The command manager 334 is envisioned to be able to communicate (directly or indirectly) with the remote server 322 and to execute commands. Such commands may, for example, include push data and pull data, which can be used to change the priority on a file that is being transferred, so that it is shipped ahead of or after the rest (or select ones) of the current queue members.

The receiver site 304 can further include one or more file installer/s 332. The file installers 332 may perform one or more of the following: verify whether meta data of predecessor and object being installed are in place, verify whether the RCS 318 of predecessor is in place, install the object into the RCS 318, update object's meta data, send acknowledgment as required, update flags including CompleteTime (indicating the time the installation was complete) and Installation Message (any messages resulting from the installation) on, for example, a source database (where the file being installed is located), and delete any unused buffer files utilized for the installation. It is envisioned that the file installer 332 may be a thread spawned by the remote server 322.

It is also envisioned that the send daemon 312 may perform one or more of the following: perform handshake operations between the sender and receiver sites, initiate a file transfer or a command execution, execute a remote method invocation (RMI) call on the remote server 322, transfer job description, request/provide a port number, spawn a file sender (such as 324) along with passing relevant port information, spawn a command sender (such as 328), wait on the local queue 314 for more jobs, and keep a balance in the number of existing transport channels. Further, the remote server 322 may provide remote methods to the send daemon 312 to initiate a file transfer or a command execution. The remote server 322 may also keep an account on file receiver/file installer counts, spawn the file receivers 326 to receive files, and spawn file installers 332 when the remote queue 323 receives a new member.

The communication system 300 may further include a service provider 338. The service provider 338 may provide a variety of services to the system components including one or more of the following: handling periodic registrations from key modules, subscribing and unsubscribing of available monitoring services, routing the monitor messages to the corresponding monitors, and providing a pointer to the correct log file for remote modules. It is envisioned that one service provider 338 is sufficient for the entire system. In an embodiment, the service provider 338 may run on a primary site.

Also, the communication system 300 may further include a database manager module (not shown), which may provide useful application programming interfaces (APIs) to, for example, insert, update, delete, and select information on various tables in the databases present in the communication system 300. Such a database manager may be implemented as a Java object.

It is envisioned that an interface between a user command and transparent transport layer may be a database. More specifically, this interface may be a transfer table. Such a transfer table may store the required information about each file transfer. Each user command, after successful completion, may in turn deposit a transfer request into the transfer table. Furthermore, it is envisioned that the DB Reader 310 may be present on all sites where there is a possibility of users checking in files. The DB Reader 310 having sensed what needs to be transferred can buffer the jobs into the respective queues of the destinations. It also can spawn the send daemon 312, for each destination and from then on, it may hand over the corresponding queue to it. The send daemon 312 may then handle the handshake between itself and the remote server 322, and establish full-duplex communication channels for example, to transfer files and receive acknowledgments. This may involve creation of file sender—file receiver pairs (324 and 326, respectively) on sender and receiver sites, respectively. If the command is other than create or save data, the command sender 328 and command executor 330 pairs may be created.

The file sender 324 can transfer a file, and the checksum of that file over the established channel, and wait for the acknowledgment from the file receiver 326. The file receiver 326 having received the file, may perform a checksum verification between the received checksum, and the re-calculated checksum on the receiver site 304. If they tally, a positive ACK maybe sent to the file sender 324. Otherwise, a NAK may be sent. Upon receiving an ACK, the file sender 324 may update the ReceivedTime in, for example, the transfer table and exit. On receiving a NAK, the file sender 324 may re-transfer the file. The iteration may be continued until a positive ACK is received, or once the file sender 324 times out. If the file sender 324 times out, it may enter a panic state, and send out e-mails to an appropriate target (such as a system administrator).

Once a file is received correctly, the file receiver 326 may copy the file to its designated buffer area, and enter the job description into the remote queue 323, and also register the job in an appropriate (e.g., RemoteQ) table in the database 316. In case of the remote server 322 break down, the remote queue 323 may rebuild the required information from the database 316. In such a case, the remote server 322 may start a FileInstaller thread for each file received (such as file installer 332). The FileInstaller can be responsible for the installation of the file in the RCS 318, and for updating a VersionHere bit in a FileVersions table in the database 316. The FileInstaller may perform a series of checks for the presence of both the predecessor's and the file's meta-data, and also the RCS version of the predecessor. Upon having verified all the dependencies, the file may be checked into the RCS 318. Then the FileVersions, TransferConfirm, and RemoteQ tables may be notified of the successful installation, and the CompleteTime and Installation Message entries (or columns) may be set on the source database, i.e., the database on the site where the file originated. This process may complete the file transfer procedure in accordance with an embodiment of the present invention.

The above procedure may be applied where the command is either create or save data. If the command is one of delete data, delete directory, or copy data, a command sender (such as the command sender 328) may be started instead of the file sender 324. The command sender 328 may then wait for the ACK from the corresponding command executor 330. Having received the ACK/NAK, the acknowledgment may be recorded in the database 316, and a panic mail may be sent in case of NAK. In case of delete data or delete directory, a deletor thread may be spawned, for example, as a part of the command sender 328. This thread may wait for the positive acknowledgments from all the sites, for example, from its VectorOut. Having received them, the deletor thread can delete the RCS files from the local central directory, and then clean the meta-data on its site. This process may replicate to other sites, through meta-data replication, for example.

Figure 4:
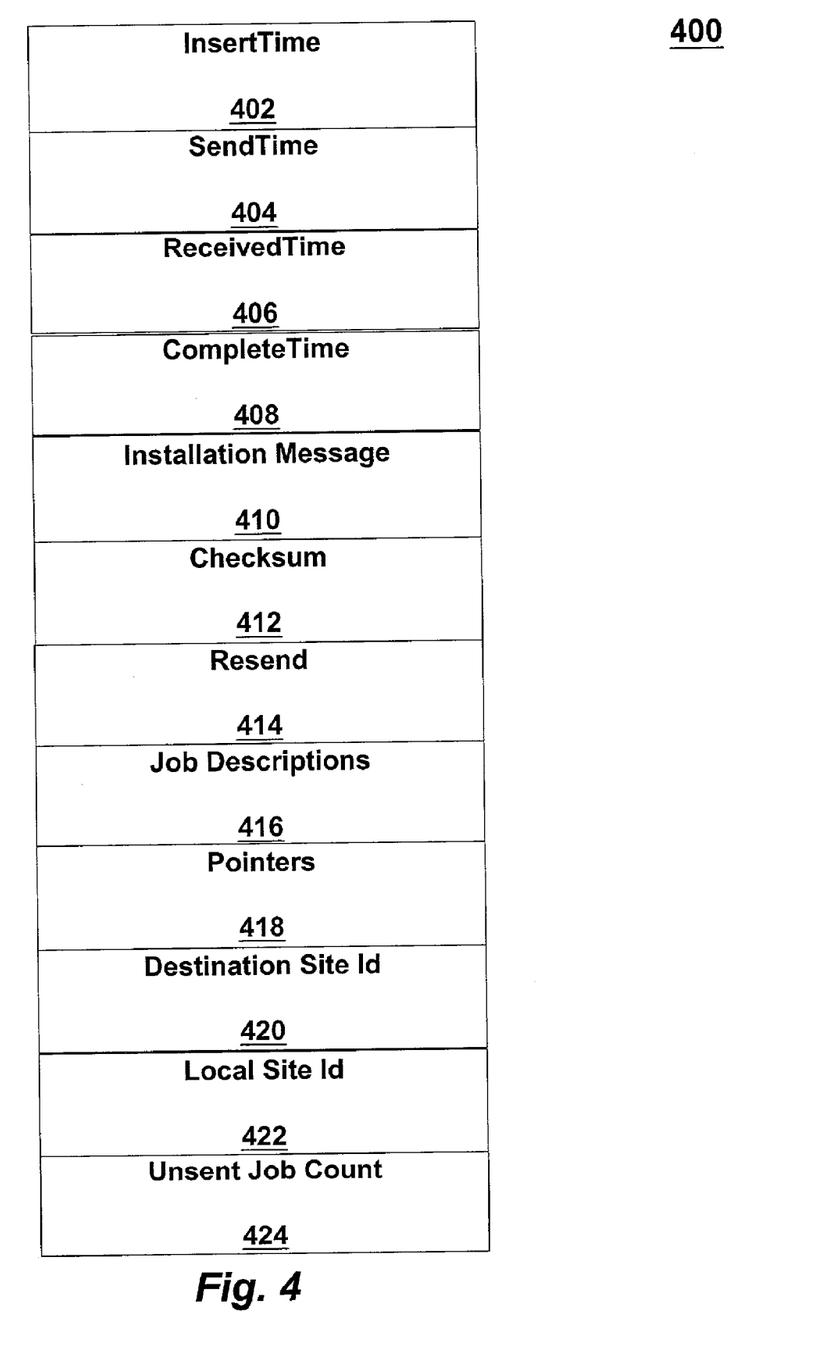
FIG. 4 illustrates an exemplary local queue 400 in accordance with an embodiment of a present invention.

FIG. 4 illustrates an exemplary local queue 400 in accordance with an embodiment of a present invention. It is envisioned that in certain embodiments the local queue 400 may be the same or similar to the local queue 314 of FIG. 3. Moreover, the order of the fields of FIG. 4 is for illustrative purposes and it is envisioned that these fields may be reshuffled as desired. The local queue 400 may be maintained on a source data site (such as the sender site 302 of FIG. 3) and identified in a local site id field 422. The local queue 400 may include information regarding identity of a destination site, such as in a destination site id field 420. In an embodiment, the local queue 400 may be responsible for storing job descriptions (416) and pointers (418) to actual physical user file and other appropriate meta-data.

Moreover, the local queue 314 may provide one or more of the following functions: storage for unsent jobs and arrangement of pending jobs according to their priority (e.g., first-come, first-serve (FCFS) for jobs with no or same priority). The local queue 400 may keep track of the number of unsent jobs in, for example, an unsent job count field 424. In an embodiment, the local queue 314 may be implemented as a Java object. The local queue 400 may have the jobs numbered and ordered according to job priority. The local queue 400 may dynamically reorder the queue to accommodate incoming jobs and their priorities. In an embodiment, at any point in time, an instance of the local queue 400 may be maintained in a main memory (such as the main memory 104 and/or the mass storage 114 of FIG. 1). If the system reboots, crashes, shuts off, or otherwise loses power, the local queue 400 can be rebuilt from nonvolatile memory (such as the mass storage 114 of FIG. 1) in the same manner that existed prior to the power loss.

As illustrated in FIG. 4, the local queue 400 may include a number of time stamp fields. An InsertTime field 402 indicates the time when a job is inserted into the local queue 400. The InsertTime field 402 may be updated by a user command responsible for requesting a file transfer, for example. A SendTime field 404 indicates the time when a job (or file) is actually dispatched. The SendTime field 404 may be updated, for example, by the send daemon 312 of FIG. 3. A ReceivedTime field 406 indicates when a file has reached the destination site (for example the receiver site 304). The ReceivedTime field 406 may be updated by a remote server after successfully receiving a transferred file (such as the remote server 322 on the receiver site 304). A CompleteTime field 408 indicates when a file is actually installed into, for example, a backend version control system including setting all required flags in an appropriate database, concluding the transaction. With respect to FIG. 3, such a completion may be achieved once a file installer 332 finishes its tasks including updating the appropriate tables in the database 316 and the RCS 318. The CompleteTime field 408 may be updated by a remote server on, for example, a receiver site (such as the remote server 322 on the receiver site 304).

In an embodiment, the local queue 400 includes an installation message field 410. The installation message field 410 may store a comment (e.g., a brief one such as one-liner or more extended comment for debugging purposes, for example) regarding installation status of a transaction. The installation message field 410 may be updated by a file installer on a remote site (such as the file installer 332 on the receiver site 304). Upon a successful completion, the stored comment may start with "ACK," and specify that a file was successfully created or saved. Upon a failure, the stored comment may start with "NAK," and indicate what went wrong. It is envisioned that such a field can be very helpful in debugging and trouble-shooting.

The local queue 400 may be very helpful in calculating delays and elapsed times including how long it took for a file to reach its destination, how long it took for the file to be installed into a version control, how long the file spent on the wire, how long was the waiting for the meta-data and predecessors, and the like. In an embodiment, such information can assist in keeping track of the performance of a system under different network conditions, and help in tuning the system accordingly.

As illustrated in FIG. 4, the local queue 400 can also include a checksum field 412. The may contain information regarding checksum of a file being transferred. In an embodiment, the checksum field 412 may be calculated during the insertion of a job into the local queue 412. A file receiver (such as the file receiver 332 of FIG. 3) may compare the checksum on the physical file with the checksum stored in the local queue 412 for correctness. The file can then be rejected if the two values do not match. The local queue 400 can also include a resend field 414 which may be utilized for re-dispatching a job when required (e.g., in cases where the transaction was unsuccessful).

Figure 5:
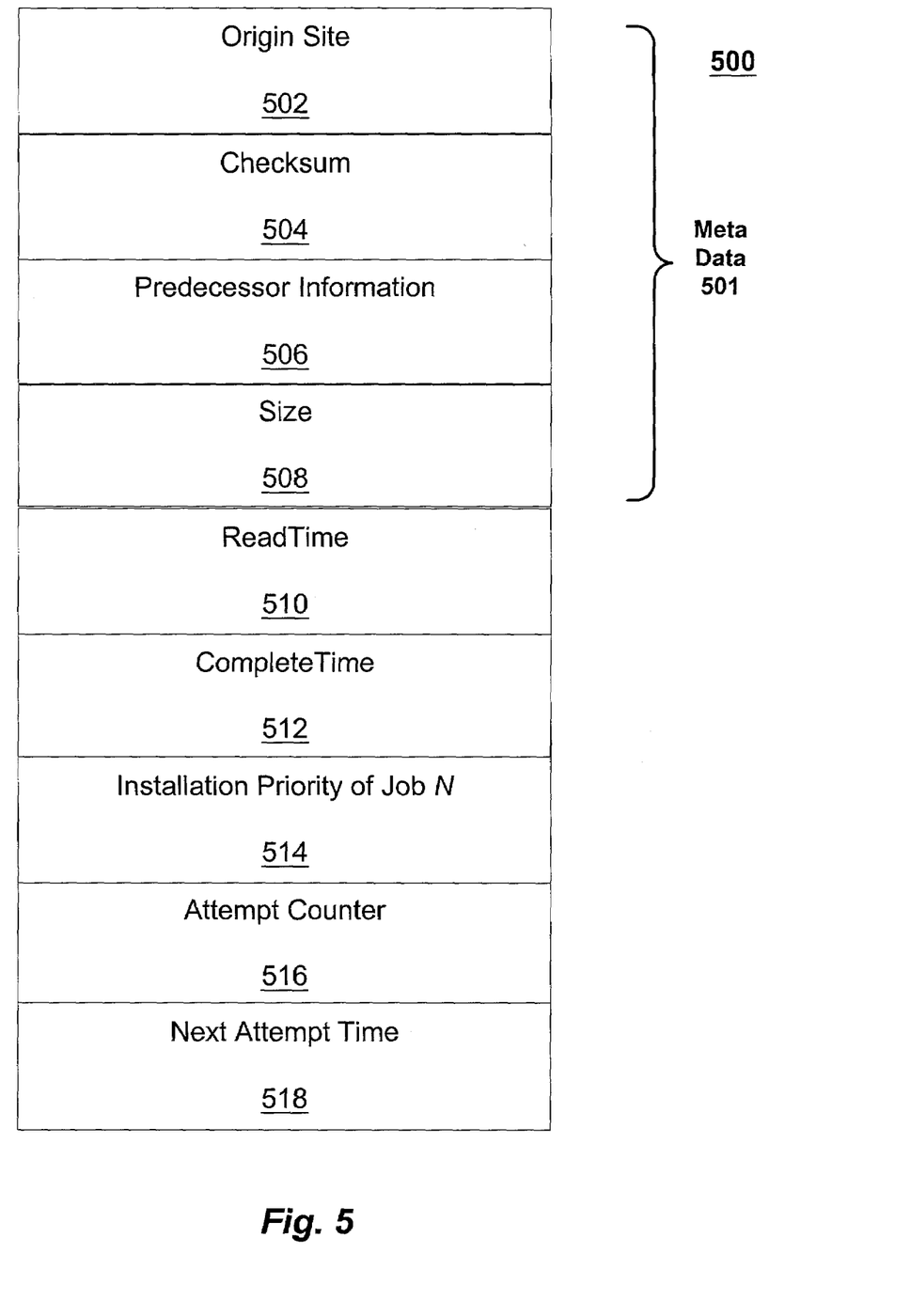
FIG. 5 illustrates an exemplary remote queue 500 in accordance with an embodiment of a present invention.

FIG. 5 illustrates an exemplary remote queue 500 in accordance with an embodiment of a present invention. It is envisioned that in certain embodiments the remote queue 500 may be the same or similar to the remote queue 323 of FIG. 3. Moreover, the order of the fields of FIG. 5 is for illustrative purposes and it is envisioned that these fields may be reshuffled as desired. The remote queue 500 may be maintained on a recipient data site (such as the receiver site 304 of FIG. 3).

In an embodiment, the remote queue 500 stores data associated with a successfully received file, which needs to be installed into the backend version control system at the recipient site. Accordingly, in certain embodiments, the remote queue 500 may include two parts. First, meta data (501) which may be stored in the database (such as the database 316 of FIG. 3). Second, the physical data which may be stored on a disk, for example (such as the mass storage 114 of FIG. 1 and/or the RCS 318 of FIG. 3). The physical data may be stored in a buffer space until it can be installed. The meta data may be stored in a table in a database and contain information about the transferred data such as the origin site (502), checksum(s) (504), predecessor information (506), size (508), and the like.

The remote queue 500 may also include two timestamps ReadTime 510 and CompleteTime 512 that may be utilized in recording when a job was started and when it was done. This helps in gathering performance statistics as well. In an embodiment, a primary advantage is that the remote queue 500 may be reconstructed by reading the table in the database, after the remote installer reboots from a crash, restarts, or otherwise recovers from a power loss. The remote queue 500 may also include a priority field (514) associated with order of installation for each job.

When installing a received file, a file installer (such as the file installer 332 of FIG. 3) accesses the remote queue 500 on periodic basis and retrieves information regarding a new job. In an embodiment, the remote queue 500 is polled every ten (10) seconds. It is however envisioned that more or less frequent polling may be chosen depending on the quality of the communication channels, system performance, or other relevant information whether determined externally or dynamically through feedback regarding system performance. The queued jobs may be popped out in the order of priority (and installed likewise). If the installation is unsuccessful, the job may be marked as incomplete in the database table, and an attempt counter 516 may be incremented. Also, a next attempt time field 518 may be set to the next slot. Such an implementation can provide exponential back-off and optimizes the usage of system resources including the file descriptors, memory, and the like.

In an embodiment, it is envisioned that exponential back-off may be a very effective technique for managing multiple thread and/or processes contending for shared resources. In particular, exponential back-off allows any thread and/or process to use some resource for a given time, without being able to release the resource in the defined amount of time. The resource will then be released irrespective of whether the process has finished its task successfully. As a result, all the processes waiting for a given resource will be provided with a fair chance to utilize the resource of interest. If the process that has been allocated the resource cannot finish its task in the allocated time due to any reason such as wait for other unavailable resource, system not responding, and the like, the process will release the allocated resource back to the pool and reclaim it when the process believes it can use it again. If the process is not successful in finishing its task utilizing the reallocated resource again, the process will release the resource again, but will reclaim it after waiting for a longer time period than the previous wait time. Accordingly, the process waits longer and longer each time to reclaim a resource, resulting in back-offs from the resource in an exponential like manner. In an embodiment, the process will eventually either finish successfully or time out. This will ensure that other successful processes do not suffer from unfairness and/or starvation.

Therefore, in accordance with certain embodiments of the present invention, the procedure for receiving a file at a recipient site is independent of installing the file on the recipient site. This bifurcation is envisioned to yield better performance, be more tunable, provide improved control, and allow for load balancing (for example, among distributed systems). Also, some embodiments of the present invention address the problems associated with keeping live data on a particular site, spoke, or a domain, in sync with the data on multiple remote spokes in real-time. In a user community distributed across a country or anywhere in the globe, the need arises to have select data be available on any site at any time. Embodiments of the present invention provide users access to the latest version of the data as soon as it is released into the system from any site. Therefore, there should not be a need to wait for the new data until there is a batch update or a nightly synchronization, for example.

Additionally, if one of the remote sites is down or cannot accept external data, the systems provided in accordance with some embodiments of the present invention can temporarily store (e.g., buffer or queue) the new data until the remote spoke is back on-line. Further, the system can work with the configuration control mechanisms (CCM) on each site and can install the new data into the CCM on the remote sites. Additionally, the system can work with meta data (if any) in, for example, the backend database storage, so that the user commands or interfaces to the database function accurately during any synchronization process.

The foregoing description has been directed to specific embodiments. It will be apparent to those with ordinary skill in the art that modifications may be made to the described embodiments, with the attainment of all or some of the advantages. For example, the schemes, data structures, and methods described herein can also be extended to other applications. More specifically, any type of data may be transferred utilizing embodiments of the present invention. Also, the transfer systems provisioned in accordance with embodiments of the present invention may be configured depending on a specific project, data types, number of users, size of files, location of users, and the like. Further, the routines described herein may be implemented utilizing Java programming techniques. Therefore, it is the object of the appended claims to cover all such variations and modifications as come within the spirit and scope of the invention.

What is claimed is:

1. A communication system comprising:
   a distributed file system including a plurality of remote systems, the plurality of remote systems including a sender site and a receiver site, the sender site to transfer a file to the receiver site;
   a local queue accessible by the sender site to store data associated with the transfer of the file; and
   a remote queue accessible by the receiver site to store data associated with the transferred file and including:
      a next attempt time indicator, the next attempt time indicator specifying a next time to install the transferred file from the sender site on the receiver site; and
      an attempt counter, the attempt counter indicating how many attempts have been made by the receiver site to install the transferred file on the receiver site,
   wherein receiving the file at the receiver site is independent of installing the file at the receiver site, and
   wherein the attempt counter and the next attempt time indicator operate together to exponentially back off each subsequent try by the receiver site to install the transferred file on the receiver site.

2. The communication system of claim 1 wherein the local queue and remote queue assist in synchronizing data on the sender site and the receiver site by providing storage for the file if either the sender site or receiver site is inoperable.

3. The communication system of claim 1 wherein the attempt counter is incremented every time an installation of the transferred file is unsuccessful.

4. The communication system of claim 1 wherein the remote queue is accessible by the sender site.

5. The communication system of claim 1 wherein the local queue includes one or more fields selected from a group comprising insert time, send time, received time, installation message, checksum, resend, job description, pointers, destination site id, local site id, and unsent job count.

6. The communication system of claim 1 wherein the remote queue includes one or more fields selected from a group comprising origin site, checksum, predecessor information, size, read time, complete time, and installation priority of job N.

7. The communication system of claim 1 wherein the sender site further includes a database reader to access information stored in the sender site database.

8. The communication system of claim 1 wherein the receiver site further includes a remote server to access information stored in a receiver site database.

9. The communication system of claim 1 further including an Revision Control System (RCS) for at least one of the sender site and the receiver site.

10. The communication system of claim 1 wherein the sender site further includes a send daemon to transfer the file.

11. The communication system of claim 1 wherein the sender site and the receiver site are configured in a hub and spoke network.

12. A method comprising:
    providing a distributed file system including a plurality of remote systems, the plurality of remote systems including a sender site and a receiver site, the sender site to transfer a file to the receiver site;
    providing a local queue accessible by the sender site to store data associated with the transfer of the file; and
    providing a remote queue accessible by the receiver site to store data associated with the transferred file, the remote queue including:
       a next attempt time indicator, the next attempt time indicator specifying a next time to install the transferred file from the sender site on the receiver site; and
       an attempt counter, the attempt counter indicating how many attempts have been made by the receiver site to install the transferred file on the receiver site;
    wherein receiving the file at the receiver site is independent of installing the file at the receiver site, and
    wherein the attempt counter and the next attempt time indicator operate together to exponentially back off each subsequent try by the receiver site to install the transferred file on the receiver site.

13. The method of claim 12 wherein the local queue and remote queue assist in synchronizing data on the sender site and the receiver site by providing storage for the file if either the sender site or receiver site is inoperable.

14. The method of claim 12 further including incrementing the attempt counter each time an installation of the transferred file is unsuccessful.

15. The method of claim 12 wherein the remote queue is accessible by the sender site.

16. The method of claim 12 wherein the local queue includes one or more fields selected from a group comprising insert time, send time, received time, installation message, checksum, resend, job description, pointers, destination site id, local site id, and unsent job count.

17. The method of claim 12 wherein the remote queue includes one or more fields selected from a group comprising origin site, checksum, predecessor information, size, read time, complete time, and installation priority of job N.

18. The method of claim 12 wherein the sender site further includes a database reader to access information stored in the sender site database.

19. The method of claim 12 wherein the receiver site further includes a remote server to access information stored in a receiver site database.

20. The method of claim 12 further including a Revision Control System (RCS) for at least one of the sender site and the receiver site.

21. The method of claim 12 wherein the sender site further includes a send daemon to transfer the file.

22. The method of claim 12 wherein the sender site and the receiver site are configured in a hub and spoke network.

23. An apparatus comprising:
  a distributed file system including a plurality of remote systems, the plurality of remote systems including a sender site and a receiver site, the sender site to transfer a file to the receiver site;
  a local queue means accessible by the sender site to store data associated with the transfer of the file; and
  a remote queue means accessible by the receiver site to store data associated with the transferred file and including:
    a next attempt means, the next attempt means specifying a next time to install the transferred file from the sender site on the receiver site; and
    an attempt counter means, the attempt counter means indicating how many attempts have been made by the receiver site to install the transferred file on the receiver site,
  wherein receiving the file at the receiver site is independent of installing the file at the receiver site, and
  wherein the next attempt means and the attempt counter means operate together to exponentially back off each subsequent try by the receiver site to install the transferred file on the receiver site.

24. The apparatus of claim 23, wherein the local queue and remote queue assist in synchronizing data on the sender site and the receiver site by providing storage for the file if either the sender site or receiver site is inoperable.

25. The apparatus of claim 23, wherein the attempt counter means is incremented every time an installation of the transferred file is unsuccessful.

26. The apparatus of claim 23, wherein the remote queuing means is accessible by the sender site.

27. The apparatus of claim 23, wherein the local queuing means includes one or more fields selected from a group comprising insert time, send time, received time, installation message, checksum, resend, job description, pointers, destination site id, local site id, and unsent job count.

* * * * *